United States Patent [19]

Irwin et al.

[11] Patent Number: 4,512,792
[45] Date of Patent: Apr. 23, 1985

[54] COOLING WIND SHUT-OFF VALVE FOR GLASS FORMING MOLD

[75] Inventors: George W. Irwin, Holland, Ohio; Eustace H. Mumford, Ottawa, Mich.

[73] Assignee: Owens-Illinois, Inc., Toledo, Ohio

[21] Appl. No.: 512,265

[22] Filed: Jul. 11, 1983

[51] Int. Cl.³ .............................................. C03B 11/12
[52] U.S. Cl. .......................................... 65/161; 65/82; 65/162; 65/265; 65/267; 65/319; 65/356
[58] Field of Search ...................... 65/29, 82, 162, 265, 65/267, 319, 355, 356, 234, 161

[56] References Cited

U.S. PATENT DOCUMENTS 2,751,715 6/1956 Denman ............................ 65/319 X
3,586,491 6/1971 Mennitt ............................. 65/356 X
3,860,407 1/1975 Fertik ................................. 65/29 X
4,426,218 1/1984 Cabrera-Montante ............... 65/267

Primary Examiner—Arthur Kellogg
Attorney, Agent, or Firm—Gerald T. Welch; Steve M. McLary; John R. Nelson

[57] ABSTRACT

The cooling wind for the molds on a glass bottle forming machine is controlled by a damper which is set by hand and positioned in the air passages from the section box or base of a glass forming machine and a nozzle base bolted to the top of the section box. As a further control for the air a piston operated vane positioned such that it will shut off the air to the air passages upon receipt of an air signal from the timing system of the machine is provided and is to be operated each cycle of the machine to prevent cooling air from impinging on bare glass.

6 Claims, 7 Drawing Figures

COOLING WIND SHUT-OFF VALVE FOR GLASS FORMING MOLD

BACKGROUND OF THE INVENTION

In glass forming machines of the individual section (I.S.) type, it is typical that they be provided with cooling wind stacks adjacent the molds at a position which will permit the molds to open and close without interference. The cooling wind stacks generally take the form of a plurality of plates stacked one upon another, each of the plates having a configuration of openings facing in the general direction of the molds. This system of cooling is utilized both on the blow mold side of the forming machine, as well as on the parison mold side of the forming machine.

In the application of the cooling wind to the forming molds, it has been the practice to regulate the amount of air in a somewhat haphazard manner, and the present invention therefore has as its object a more controlled and regulated system for providing cooling wind to the forming molds of an I.S. type machine.

More particularly, it is an object of this invention to provide a remote operating shut-off valve for the wind supply so that the wind may be shut off when the molds are open to avoid having the cooling wind strike either the parison, or parisons as the case may be, or the newly formed blown containers. When cooling wind strikes the parisons, there is the distinct possibility of the parisons collapsing, and in the case of the blown container, it is possible to cause checks in the side wall or in other portions of a glass container if it is exposed to a direct wind chill.

SUMMARY OF THE INVENTION

A glass forming machine wherein a plurality of charges of molten glass are simultaneously formed in molds at a forming station and cooling air is supplied to the hollow base of the machine. Means are provided for controlling the application of cooling air to the molds, wherein an elongated hollow wind nozzle base, which is mounted beside each of the sets of molds at the forming station, has the air from the machine base therebelow controlled by a manually positioned damper plate which extends across the base of the nozzles. Below the nozzle base and between the machine base and the nozzle base is positioned a shut-off valve which is cyclically operated so that it shuts the air off while the molds are open and the glass parison or bottle would be exposed to the cooling air.

DETAILED DESCRIPTION OF THE DRAWINGS

Figure 1:
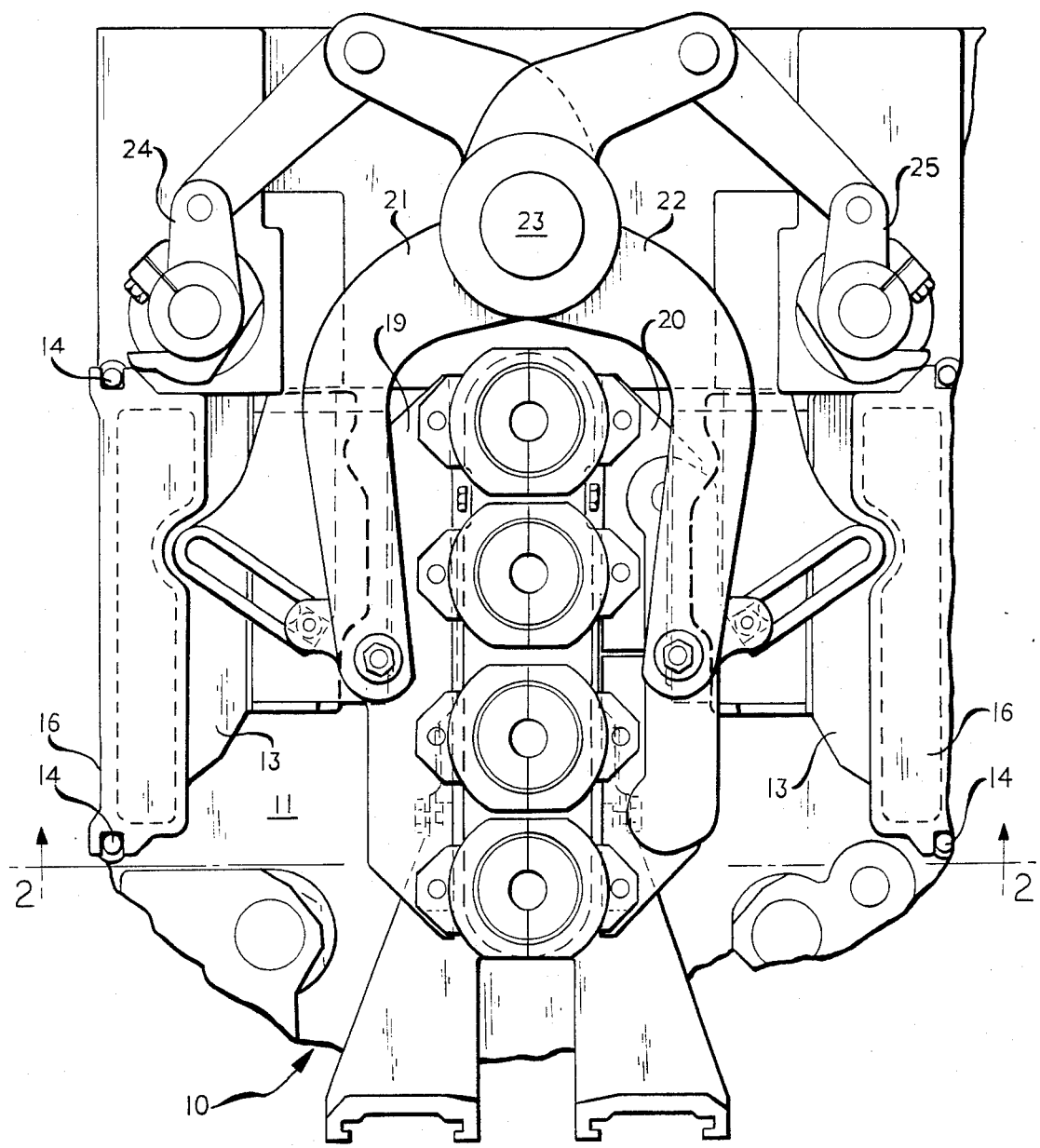
FIG. 1 is a plan view of the apparatus of the invention, shown in conjunction with multiple cavity parison molds.
Figure 2:
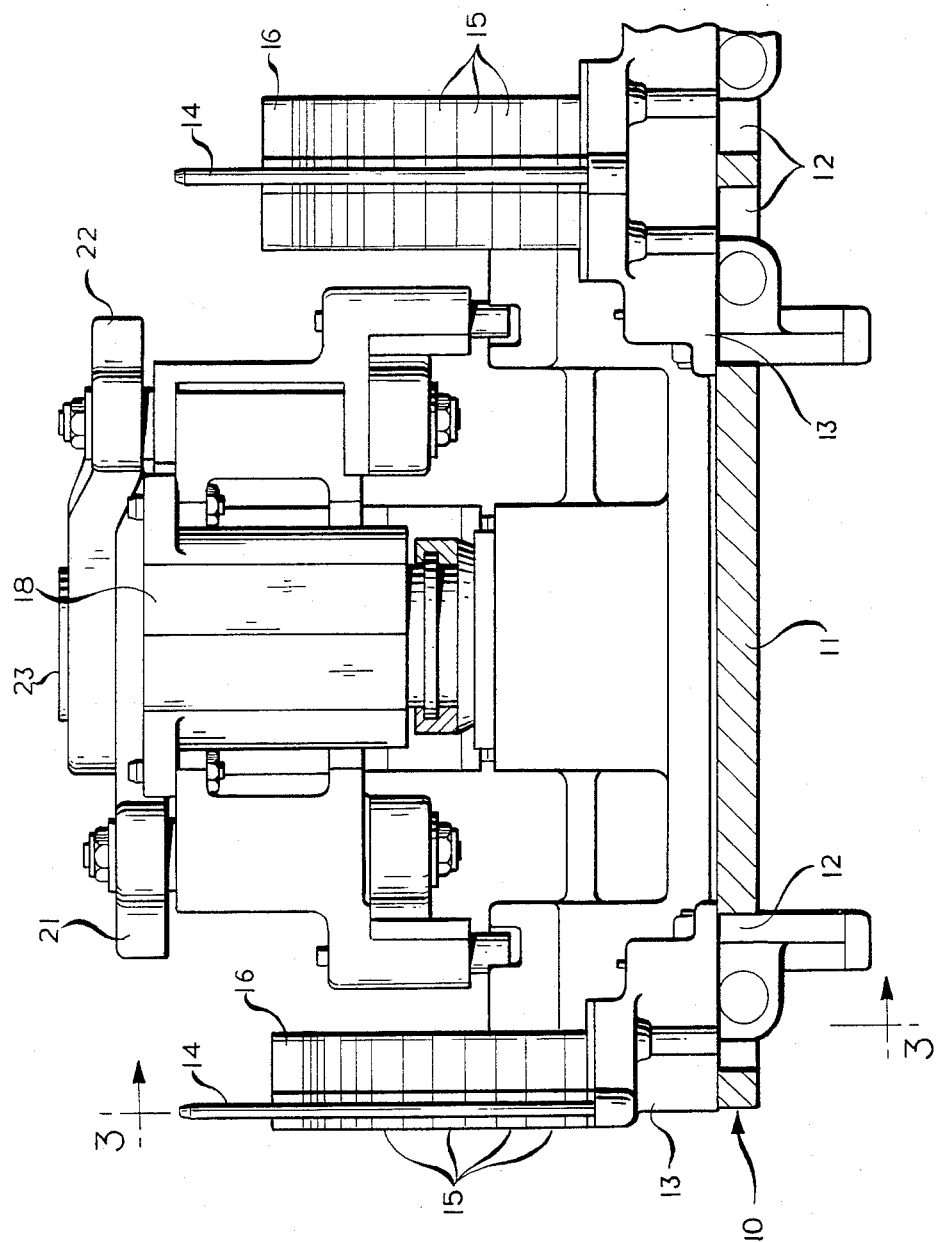
FIG. 2 is an end view, taken at line 2—2 of FIG. 1.

With particular reference to FIGS. 1 and 2, the general arrangement of the invention will be described in conjunction with its application to the parison forming molds of an I.S. type machine for simultaneously forming four containers at a time. While the disclosure will be specifically directed to the parison mold side of the forming machine, it should be kept in mind that the invention is equally applicable to the mold or blow mold side of a forming machine as well. A detailed description of the forming molds at the parison side of the I.S. machine, as depicted in FIGS. 1 and 2 hereof, may be found in U.S. patent application Ser. No. 498,383 filed May 26, 1983, now U.S. Pat. No. 4,486,215, of common assignee.

A section box or base 10 has a top plate 11 through which suitable openings 12 are provided. The cooling air which is contained within the section box base may pass upwardly through each of the openings 12 and will pass into a nozzle base 13. Each of the nozzle bases 13 supports a pair of vertically extending guide rods 14. The lower ends of the guide rods 14 seat within sockets formed in the upper part of the casting for the nozzle bases 13. As can best be seen in FIGS. 1 and 2, there is shown a nozzle base 13 at the left side and a second nozzle base 13 at the right hand side. The nozzle base at the left hand side, as viewed in FIGS. 1 and 2, is the one section of a forming machine which is at the end of a row while the nozzle base 13 to the right would be a double nozzle base which spans the two adjacent forming machine sections. It should be understood that the forming machine boxes which define the floor space of the sections only extend a certain distance, and that adjacent machine sections are positioned in abutting relationship and the section boxes are mounted upon a common machine base (not shown).

The nozzle bases have a plurality of hollow wind boxes stacked thereon with bifurcated ends that are guided and held in position by the guide rods 14. A cap 16 of the general configuration of the wind boxes serves to close the top of the wind boxes. The wind boxes 15 have openings 17 of predetermined or preselected configuration facing in the direction of the molds carried therebetween. With the molds in the position shown in FIGS. 1 and 2, the air coming from the wind boxes 15 will impinge on the backs of the molds and effectively provide cooling for these molds.

As previously explained, the molds generally designated 18 are held in equalizer arms 19 and 20, with these equalizer arms being pivotally mounted intermediate their length to a pair of mold arms 21 and 22. These mold arms 21 and 22 are pivoted about a fixed vertical pin 23. A pair of oppositely positioned cranks 24 and 25 are connected by links to the ends of the mold arms 21 and 22 and effectively provide the closing force, as well as the opening motion, for these mold arms.

Figure 3:
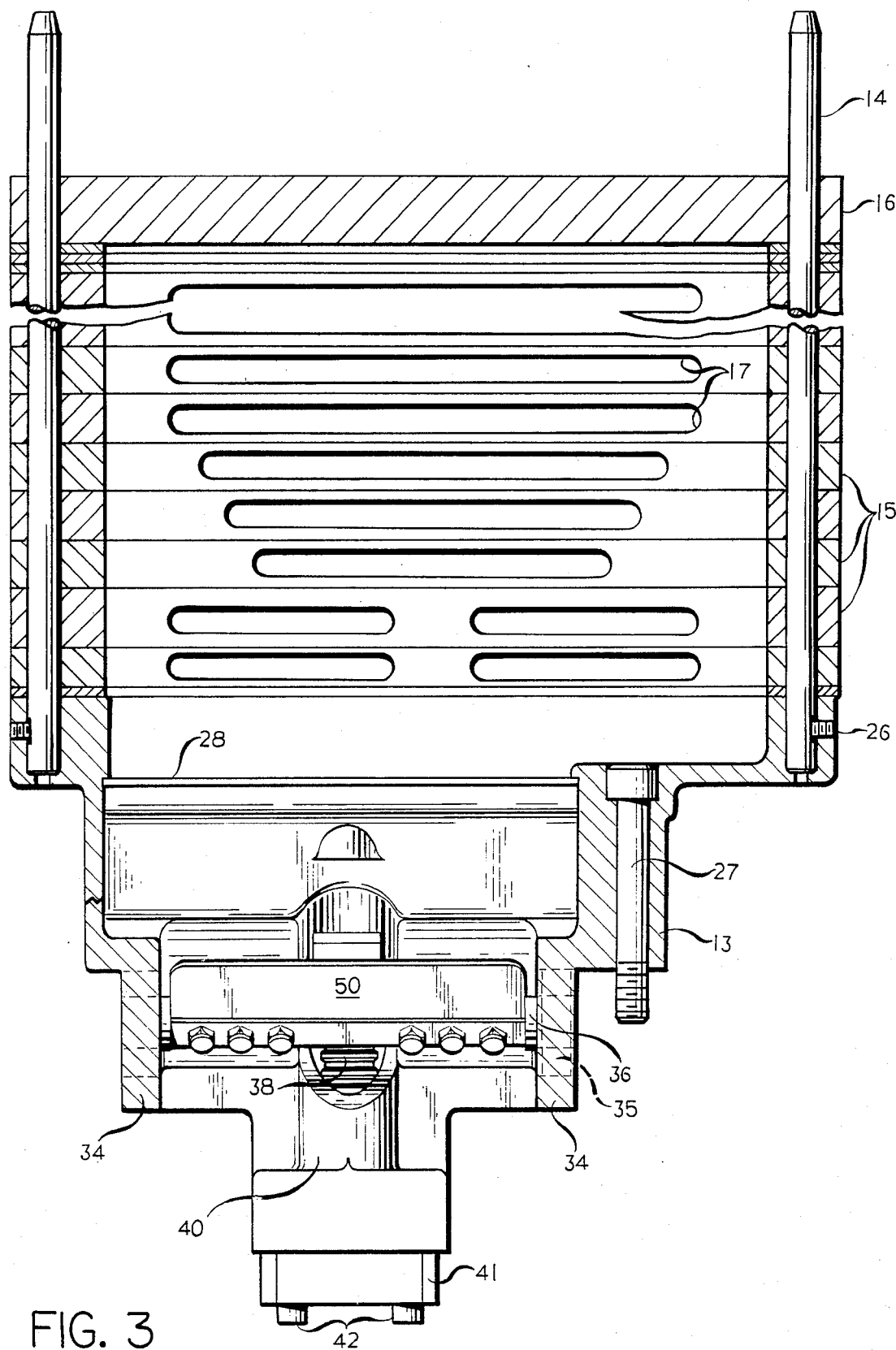
FIG. 3 is an enlarged, cross-sectional view taken at line 3—3 of FIG. 2.
Figure 4:
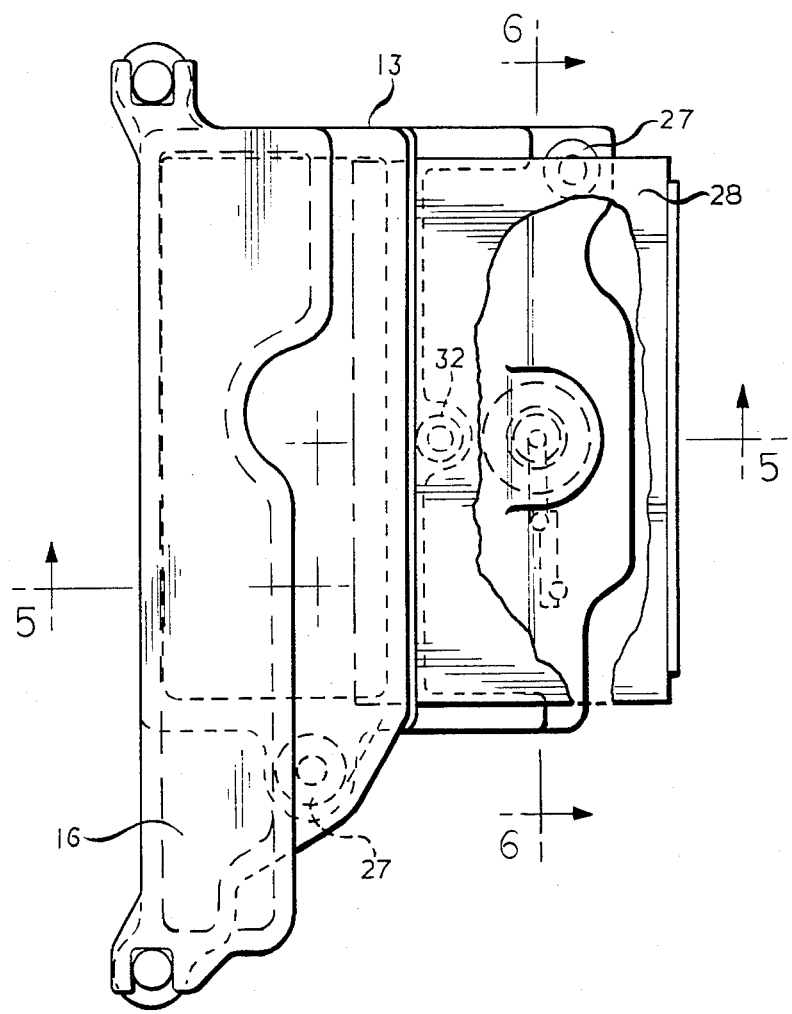
FIG. 4 is a top plan view of the mold cooling control valve of the invention.
Figure 5:
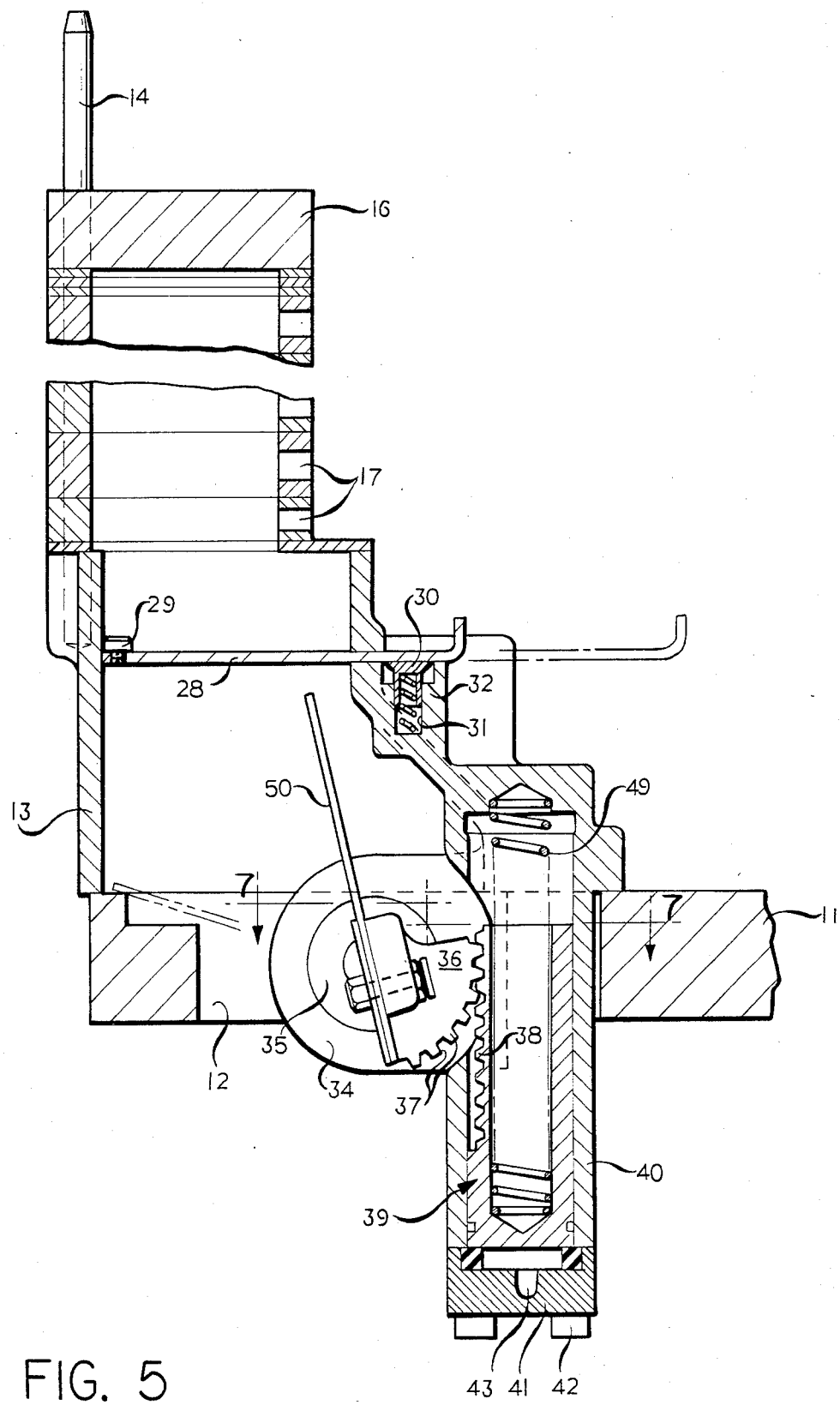
FIG. 5 is a cross-sectional view taken at line 5—5 of FIG. 4, on a somewhat larger scale.

Turning now to FIGS. 3-5, the cooling wind shut-off valve will be described in detail. As can best be seen in FIG. 3, the vertical guide rods 14 are held in the nozzle base by set screws 26 and the nozzle base is fixed to the section box by cap screws 27. Generally speaking, the nozzle base 13 is a hollow casting through which air entering from the opening 12 in the top of the section box will pass upwardly therethrough and enter the bottom of the stack of wind boxes 15, thence issuing out through the openings 17 to impinge on the forming molds. Just below the top of the nozzle base 13 is a horizontal damper plate 28 shown in its fully retracted or open position in FIG. 4 with a portion of it broken away. In FIG. 5 the damper plate 28 is shown completely across, and in effect, closing the opening between the bottom of the nozzle base 13 and the top thereof. The damper plate is provided in its upper surface with a threaded cap screw 29. The cap screw 29 serves to provide a stop for the damper plate 28 such that in the event it is pulled out to the extent shown in FIG. 4 the cap screw 29 will engage the inner hollow surface of the nozzle base 13. To maintain the damper plate in its adjusted position, a friction plug 30 is provided which extends from a cavity 31 in a ledge 32 of the nozzle base 13. Within the cavity 31 behind the plug 30 is positioned a compression spring 33. The spring 33 biases the friction plug 30 against the under surface of the damper plate 28. Thus it can be seen that movement of the damper plate to the right, as viewed in FIG. 5, will be resisted by the friction plug and when the damper plate is left in a particular position it will be retained in that position even with the normal vibration occuring in a glass forming machine.

Figure 6:
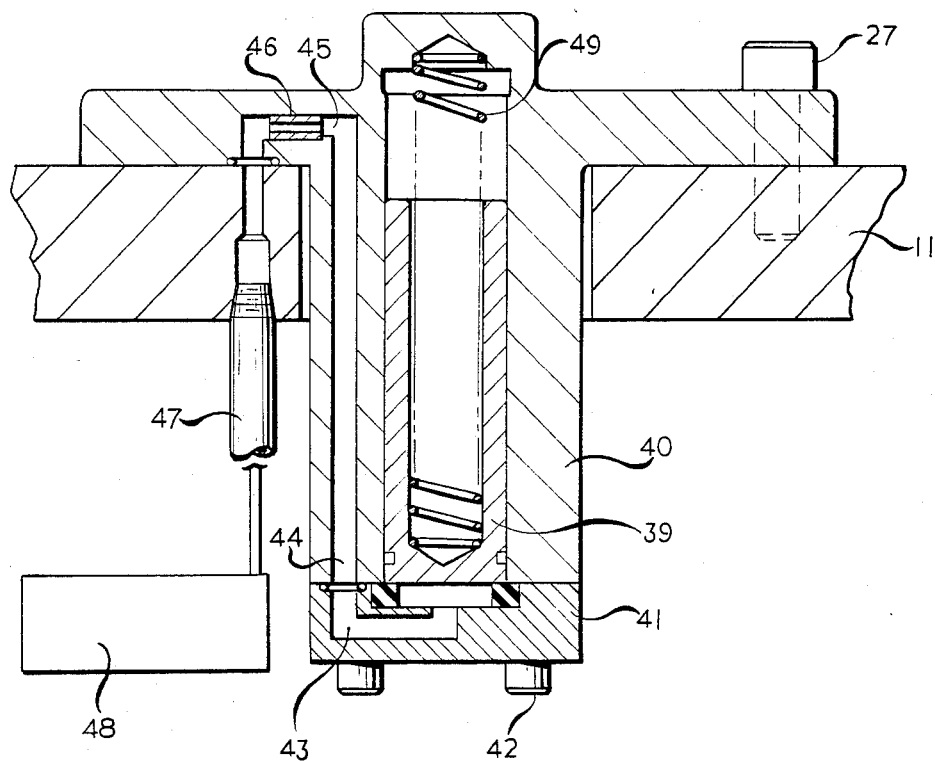
FIG. 6 is a cross-sectional view taken at line 6—6 of FIG. 4, on a somewhat larger scale; and, FIG. 7 is a cross-sectional view taken at line 7—7 of FIG. 5.
Figure 7:
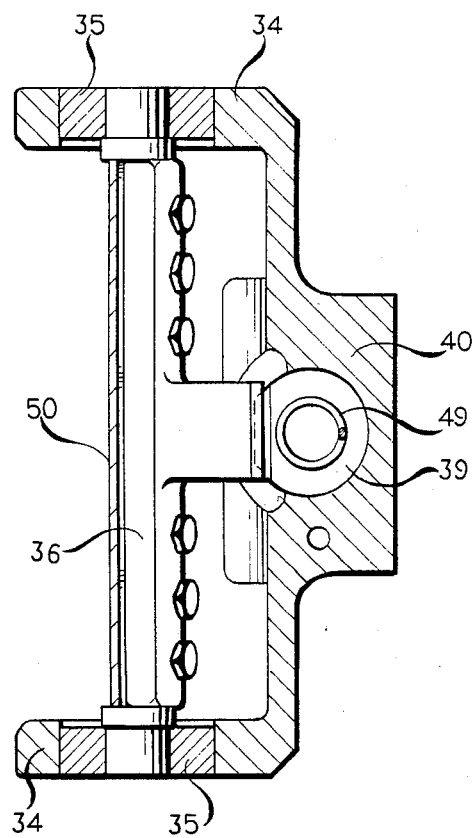

Beneath the damper plate 28 in the nozzle base 13 there is provided a pair of inwardly extending, spaced-apart bosses 34. The bosses 34 are positioned generally at either side of the lower opening through the nozzle base 13. These bosses 34 carry suitable bearings 35. The bearings 35 serve to support a shaft and gear sector 36 therebetween. The gear sector 36 has a plurality of teeth 37 formed therein. The teeth 37 are in mesh with a rack portion 38 of a piston and rod 39. The piston 39 rides within a cylinder 40 that in actual practice is a portion of the lower end of the nozzle base 13. The bottom of this cylindrical portion 40 is closed by a cylinder head 41 fastened thereto by cap screws 42. Cylinder head 41 is provided with a passageway 43 whose one end opens into the cylinder at the axis of the piston 39, and its other end is connected to a vertical passageway 44 formed in the wall of the cylinder 40, with this passageway meeting a horizontal section 45 within which an orifice plug 46 is positioned. A pipe 47 is connected to the vertical section 45 of the passageway, and it is connected at its other end to a suitable source of air under pressure controlled by a timing system 48 (not shown in detail). The piston 39 is spring-biased in a downward direction, as seen in FIGS. 5 and 6, by a spring 49. Thus it can be seen that the piston 39 upon introduction of the air under pressure through the pipe 47 will move the piston upwardly and rotate the gear and shaft 36 in a counterclockwise direction. The shaft has a flat surface opposite the gear sector 36 thereof to which is bolted a generally planar vane 50. The vane 50, in the position shown in FIGS. 5 and 7, is in its open position; however, as previously explained upon introduction of air under pressure through the pipe 47 so as to move the piston 39 against the spring 49 the vane 50 will be rotated from the position shown in full line in FIG. 5 to the dotted line position shown therein, closing off the air entirely from entering into the upper portion of the nozzle base 13.

In the normal operation of an I.S. forming machine, it has been the practice to have the damper 28 set to some level dependent on the weight of bottle being produced and the speed with which it was being made. The air issuing from the wind boxes would continue to blow onto the molds during the cycle of the operation of the machine. As previously explained, however, it is desirable to have the ability to cut the air off and control the intervals of air application during the cycle of the operation of the machine, and it is this capability which the present invention and mechanism therefore will permit. Any system which provides total shut-off of air in a cyclic manner must be rugged. It should be realized that a glass forming machine, particularly of the more modern high production types, will operate at a cycle rate of 12 to 15 cycles per minute, making as many as 475 bottles per minute. Thus the mechanism, which will be cycled once each cycle of the machine, must be of a reliable design capable of operation over an extended period of time. While the present invention is shown in connection with a quadruple cavity parison mold, it should be apparent that its utility would be equally as effective when used in conjunction with blow molds.

The use of the invention herein described in conjunction with quadruple cavity molds could find utility in forming machines having a lesser or greater number of molds without departing from the spirit of the invention.

We claim:

1. In a glass forming machine of the plural individual section type where a plurality of charges of molten glass are simultaneously formed in molds at a forming station and in a timed sequence other charges are formed in other forming stations with cooling air being supplied to the hollow base of each machine section, the improvement in the application of cooling air to the molds at the forming stations comprising, an elongated, hollow, generally horizontal, wind nozzle base mounted beside each of the sets of molds at the forming stations, said nozzle base overlying an opening in said machine base, said wind nozzle base comprising a casting having a pair of vertical cylinders formed therewith, said casting being positioned at the adjacent edges of two forming machine sections such that it is positioned between the molds on adjacent sections, each said cylinder constituting a vertical, fluid motor extending through an opening in a respective machine section base, wind directing nozzles on said nozzle base for receiving compressed cooling air from said base, a damper plate extending through a horizontal slot in the side of said wind nozzle base, said plate being manually movable relative to said base for regulating the flow volume of air from said base, means yieldably engaging said plate for maintaining said plate in its adjusted position, a fluid pressure operated rack in said motor, a gear sector mounted for rotation about a horizontal axis, said gear sector being in mesh with said rack, a vane mounted to said gear sector, said vane being of a size sufficient to close the air opening between the machine base and the nozzle base when rotated by said fluid motor, a source of fluid under pressure and a means for connecting said source to said motor for operating said motor.

2. The apparatus of claim 1 wherein said rack is spring-biased in the direction to hold the vane in its open position and compressed air means connected to move the rack against the spring.

3. The apparatus of claim 1 further including timing means for operating said motor to move said vane into closing position when the molds are to be opened and bare glass is exposed.

4. The apparatus of claim 1 wherein said gear sector is formed integral with a horizontal shaft, said shaft being mounted for rotation about its axis, said shaft having a flat portion along one side thereof, and means mounting said vane to the flat side of said shaft.

5. The apparatus of claim 1 wherein said motor includes a vertical cylinder extending downward into the machine base and formed integral with said nozzle base.

6. The apparatus of claim 1 wherein said wind-directing nozzles are a plurality of stacked hollow plates provided with openings through the walls that face the molds and a cap closing the top of the stack of nozzles.

* * * * *